United States Patent [19]

Henein

[11] 4,408,389

[45] Oct. 11, 1983

[54] ARRANGEMENT FOR ASSEMBLING A WORKING CYLINDER

[75] Inventor: Nabil Henein, Muenster, Fed. Rep. of Germany

[73] Assignee: ITT Industries, Inc., New York, N.Y.

[21] Appl. No.: 238,796

[22] Filed: Feb. 27, 1981

[30] Foreign Application Priority Data

Apr. 19, 1980 [DE]  Fed. Rep. of Germany ....... 3015111

[51] Int. Cl.³ ................... B23P 21/00; B23Q 15/00
[52] U.S. Cl. .................................. 29/715; 29/404; 29/407; 29/454; 29/510; 92/98 D; 141/65
[58] Field of Search ............... 29/157 R, 454, 404, 29/510, 407, 715; 141/65; 92/98 D; 277/42; 138/30

[56] References Cited

U.S. PATENT DOCUMENTS

| | | | |
|---|---|---|---|
| 2,436,849 | 3/1948 | Billetler | 141/65 |
| 2,521,102 | 9/1950 | Vedonell | 277/42 |
| 3,158,930 | 12/1964 | Wesstrom et al. | 29/510 |
| 3,662,791 | 5/1972 | Ruscitti | 141/65 |
| 4,268,945 | 5/1981 | Van Arman et al. | 29/407 |
| 4,296,680 | 10/1981 | Ohta et al. | 92/98 D |

FOREIGN PATENT DOCUMENTS

2030679 11/1970 France .
2712050 9/1977 Fed. Rep. of Germany .

Primary Examiner—Charlie T. Moon
Attorney, Agent, or Firm—John T. O'Halloran; Alfred C. Hill

[57] ABSTRACT

During assembly of a brake booster employed in a hydraulic brake system of an automotive vehicle, the two casing shells of the booster are moved relative to each other by compressing the elastic seal disposed between the two casing shells an amount until a predetermined distance is achieved between the surface at one casing shell used to mount a master cylinder on the booster and the force-transmitting end of the push rod of the booster. In this position, the two casing shells are then operatively connected to each other to maintain the predetermined distance. This method of assembly and the arrangement for implementing the method simplifies the manufacturing of a brake booster.

9 Claims, 2 Drawing Figures

4,408,389

ARRANGEMENT FOR ASSEMBLING A WORKING CYLINDER

BACKGROUND OF THE INVENTION

The present invention relates to a method of assembling a working cylinder, in particular a pneumatic brake booster for automotive vehicles, comprising at least a first and a second casing shell which are interconnected during assembly and sealed relative to one another by an elastic seal clamped therebetween, with the first casing shell including a mounting surface for a member to be actuated by the working cylinder, and with a working piston which acts on a push rod supported on the second casing shell remote from the member to be actuated while in the inactive position.

In working cylinders of this type, it is necessary after the assembly of all components to adjust the unit length between the mounting surface and the end of a push rod in the last operation because the tolerances permissible in the manufacture of the individual components may be cumulative in component assembly in such a way that the final unit length is materially above or below the one prescribed. If the unit length resulting after the assembly of the working cylinder were not corrected in the last operation, an inadmissibly large lost travel would ensue between the working cylinder and the member to be actuated.

In a known brake booster, the unit length is corrected in a final separate operation to conform to the prescribed nominal dimension after the final assembly of the two casing shells.

This method of manufacturing a working cylinder, in particular a brake booster, is complicated, time-consuming and expensive.

SUMMARY OF THE INVENTION

It is an object of the present invention to simplify the manufacture of a brake booster and to provide a manufacturing method for a brake booster in which the adjustment of the unit length between a mounting surface for a member to be actuated and the force-transmitting push rod is easier and which does not necessitate additional structural arrangements with regard to the brake booster.

A feature of the present invention is the provision of a method of assembling a working cylinder including a first casing shell having a mounting surface for a member to be actuated and a second casing shell supporting a working piston acting on a push rod in the direction of the member to be actuated comprising the steps of moving the first and second shells toward each other to compress an elastic seal disposed therebetween until a predetermined distance is present between the mounting surface and force-transmitting end of the push rod; and connecting the first and second shells together in a positive engagement to maintain the predetermined distance.

This method is particularly suitable for a plurality of different brake booster constructions because in these the dimensional tolerance to be corrected ranges within a controllable area due to the deformation of the seal. It is, however, also possible to alter the shape of the seal such that larger tolerances can also be compensated for.

The advantage achieved with the present invention is that it obviates the necessity of providing a special separate operation for adjustment of the unit length, i.e., the unit length can be adjusted in the same operation in which the two casing shells are positively engaged. Further, this method permits the push rod to be integrally formed, which results in reduced cost.

It is another advantage that during measurement of the unit length the casing is closed air-tight and connected to a pressure source such that the casing is pressurized to the pressure occurring in the working cylinder inactive position in its later operation. This method is advantageous because the nominal dimension is supposed to be attained only in the working cylinder inactive position when in operation later, for which reason the length is adjusted to the nominal dimension in the presence of this particular operating condition. In operation, such vacuum brake boosters are under a partial vacuum in the inactive position so that the casing is slightly compressed. To make allowance for this fact, the nominal unit length is produced during the assembly of a vacuum brake booster by having part of the air evacuated by a pump.

Another feature of the present invention is the provision of an arrangement for assembling a working cylinder including a first casing shell having a mounting surface for a member to be actuated and a second casing shell supporting a working piston acting on a push rod in the direction of the member to be actuated comprising first means to move the first and second shells into each other to compress an elastic seal disposed therebetween; measuring means supported from and controlling the first means to ensure the actual distance between the mounting surface and a force-transmitting end of the push rod is equal to a predetermined distance; and second means supported by the first means to connect the first and second shells together in a positive engagement to maintain the predetermined distance.

This arrangement has the advantage that adjustment of the nominal dimension is accomplished fully automatically by means of a machine specially designed for this purpose, and that this operation is executed in a very short period of time. Further, the accuracy of the nominal dimension is extremely constant for a large number of working cylinders manufactured according to this method so that a check is necessary within large intervals only.

It will be and advantage to introduce the measuring device into a bore of the booster, the device being arranged axially relative to the push rod, with the device secured to a plunger piston while at the same time being guided axially slidably with the plunger piston, and to arrange for a spring to urge an annular collar provided on the circumference of the measuring device into abutment with the mounting surface for the master cylinder to close the bore air-tight, while at the same time a probe arranged concentrically within the measuring device moves in the longitudinal direction into abutment with the force-transmitting end of the push rod and releases a contact when the nominal dimension is attained.

This results in the annular collar closing the bore air-tight and the working cylinder can be acted upon by the pressure occurring in the inactive position in its later operation or in its operational environment. The collar and the cylindrical section of the measuring device extending into the bore of the working cylinder are constructed like the master brake cylinder to be subsequently mounted on the mounting flange or surface of the working cylinder. This has the advantage that during adjustment of the nominal dimension the conditions occurring later with the working cylinder in operation are simulated as closely as possible.

Advantageously, the measuring device is fastened to the plunger piston, thus both devices perform identical movements, and on attainment of the nominal dimension the probe provided in the measuring device releases a contact such that both devices remain in this position.

Another advantage of the arrangement is that the annular hold-down device fastened to the plunger piston urges, by means of its bearing surface, the two casing shells into abutment with the radially outwardly extending circumferential collar of the first casing shell when the two casing shells are fitted into each other.

By arranging the hold-down device at the plunger piston in such a manner, the first casing shell is held in its position and guided. It will also be an advantage to arrange for the hold-down device to bear on the casing shell in the area in which it is supported so that the casing shell is nob subject to appreciable deformations.

Preferably, the shearing plungers directed and guided radially towards the annular collar of the second casing shell are arranged in the plunger piston. This arrangement ensures an invariably constant distance between the shearing plungers and the bearing surface provided on the circular collar of the measuring device. This makes it possible to obtain a unit length corresponding to a particularly high degree of precision.

It will be particularly useful to align the relative positions of the bearing surface of the hold-down device and of the shearing edge of the shearing plunger such that the leading edges of the sheared projections are in abutment with the collar without clearance before the hold-down device is moved back. This avoids springing back of the first casing shell when the load on the hold-down device is relieved and results in a high manufacturing accuracy.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
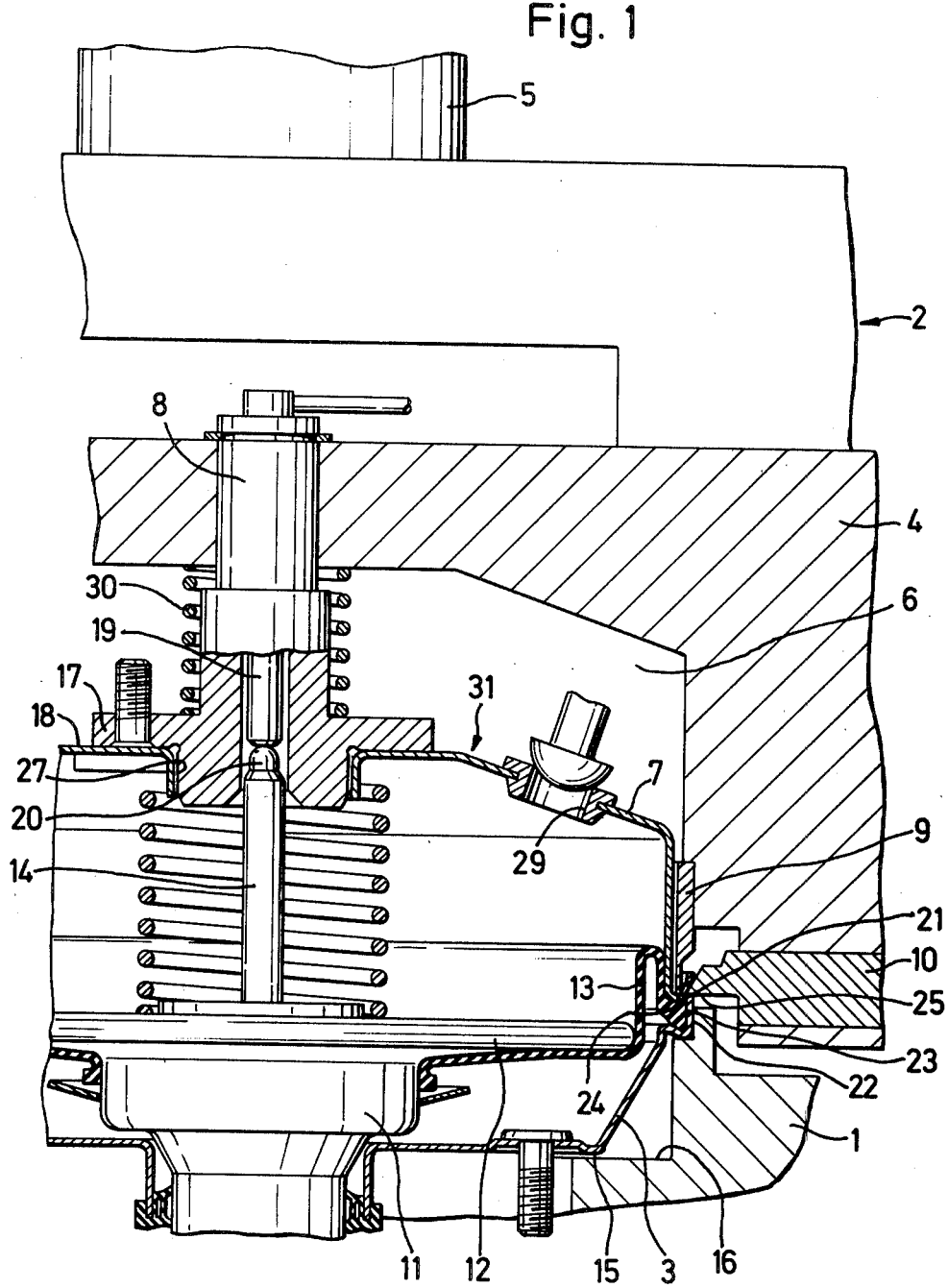
FIG. 1 is a partial cross-sectional view of an arrangement in accordance with the principles of the present invention for connecting the two casing shells of a brake booster together in accordance with the method of the present invention.

The arrangement shown in FIG. 1 includes a lower section 1 and an upper section 2. Lower section 1 serves to receive the second casing shell 3 of a brake booster 31 and is secured to a table (not shown). Upper section 2 includes a bell-shaped plunger piston 4 which is guided axially slidably via a pressing device 5 shown partially. The bell-shaped recess 6 which is open in the direction of lower section 1 serves to receive the first casing shell 7. Fastened to plunger piston 4 are measuring device 8, a hold-down device 9 and shearing plungers 10.

Arranged in the middle of casing shells 3 and 7 and forming a part of booster 31 is a control section 11 including the working piston in combination with a supporting ring 12 and a rolling diaphragm 13 abutting against supporting ring 12. Control section 11 carries a push rod 14 extending axially through a bore 27 of casing shell 7.

Figure 2:
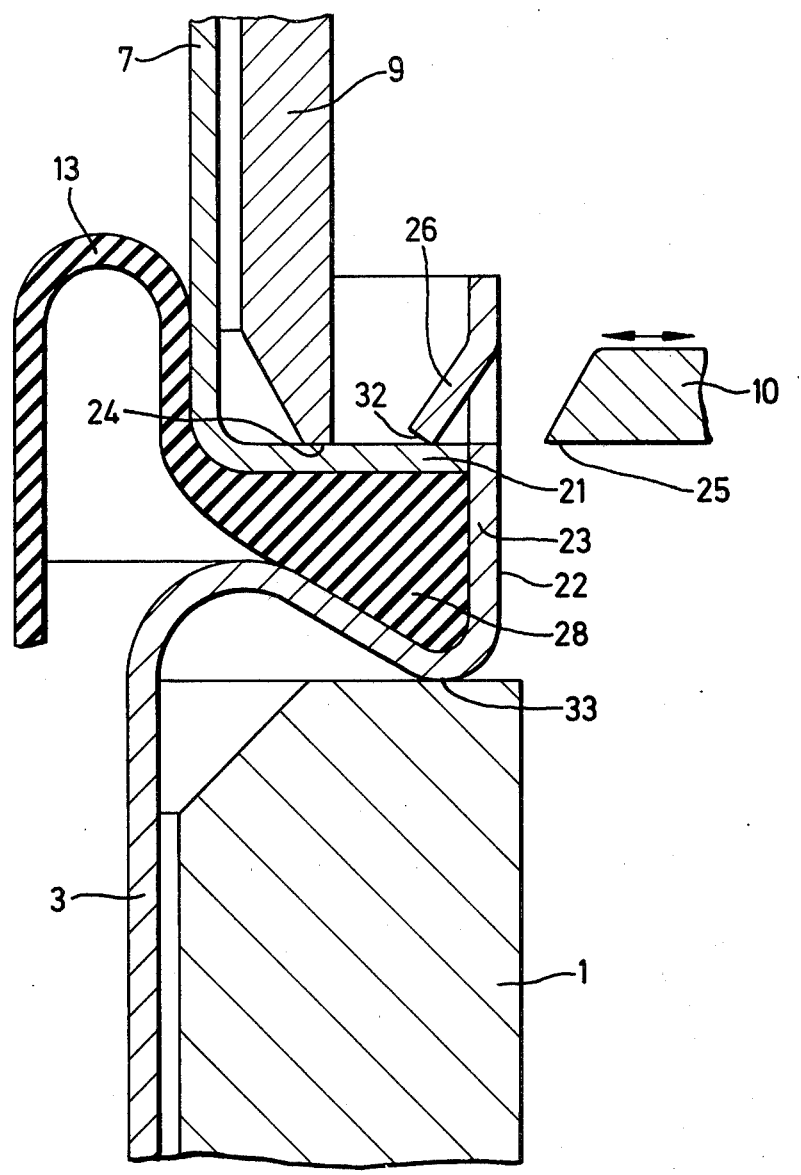
FIG. 2 is an enlarged, partial, cross-sectional view of the connection between the first and second casing shells of a brake booster manufactured in accordance with the method of the present invention.

Second casing shell 3 includes a cylindrical collar 23 having a bearing surface 33, as best seen in FIG. 2, which bears upon lower section 1, and a mounting surface 15 to be attached to a vehicle which is spaced a small distance from the annular seating surface 16 of lower section 1. The cylindrical opening of second casing shell 3 opens in the direction of upper section 2. Casing shell 7, for example, is held in bell-shaped recess 6 of plunger piston 4 by magnetic force. Measuring device 8, which is arranged axially relative to push rod 14, is secured to plunger piston 4 and at the same time guided axially slidably with plunger piston 4 to bear with its annular collar 17 on the master brake cylinder mounting surface 18 of casing shell 7, closing bore 27 in casing shell 7 air-tight. In this arrangement, a spring 30 arranged around the periphery of the measuring device urges measuring device 8 into abutment with mounting surface 18. A cylindrical probe 19 arranged concentrically within measuring device 8 abuts on the force-transmitting end of push rod 14 which has the form of a hemispherical mushroom button 20.

Hold-down device 9 exerts a pressure of the direction of lower section 1 on the radially outwardly extending circumferential collar 21 of casing shell 7. Provided on the outer periphery 22 of cylindrical collar 23 of casing shell 3, which collar encloses collar 21 of casing shell 7, are shearing plungers 10 which are guided normal to the central axis of hold-down device 9 and radially in the direction of collar 23.

The partial cross section shown in FIG. 2 illustrates on an enlarged scale the connection between two casing shells 3 and 7 having seal 28 of rolling diaphragm 13 clamped therebetween. The two casing shells 3 and 7 are in positive engagement by means of projections 26 produced by shearing plungers 10. Leading edges 32 of projections 26 are in abutment with collar 21 of casing shell 7.

The method of manufacture will be described in more detail of the following. Casing shell 3 which accommodates a control section 11, a working piston and a push rod 14 is inserted in lower section 1. Casing shell 7 is inserted in plunger piston 4 of upper section 2, which piston is lifted clear of lower section 1, and is held in this position, for example, by the action of magnetic force or vacuum. Then the surface of measuring device 8 provided on collar 17 is moved into abutment with mounting surface 18 of casing shell 7, closing bore 27 air-tight. Bore 29 is likewise closed air-tight. Then plunger piston 4 is moved via the pressing device in the direction of lower section 1 so that the two casing shells 3 and 7 are fitted into one another. In this method, bearing surface 24 of hold-down device 9 urges collar 21 against seal 28 with a predetermined load. At the same time, air is evacuated from the brake booster casing by a pump to an extent simulating later operating conditions of brake booster 31 in its inactive position. If the unit length between the end of push rod 14 and mounting surface 18 does not correspond to the nominal or predetermined length, then pressing device 5 will move the two casing shells 3 and 7 into one another until the nominal length is attained. In this method, pressing device 5 is moved by means of a transmission via a setting motor (not shown), resulting in a very slow movement permitting an accurate adjustment of the unit length. As soon as the actual dimension is equal to the nominal dimension, probe 19 abutting on the force-transmitting end of push-rod 14 will release an electrical contact which will turn off the setting motor. Then shearing plungers 10 will be actuated. They will move radially towards cylindrical collar 23 of casing shell 3, shearing with their shearing edges 25 projections 26 in collar 23 which provide for positive engagement of the two casing shells 3 and 7. Then upper section 2 will retract to its initial position, and the finally assembled brake booster 31 is ready for removal from lower section 1.

While I have described above the principles of my invention in connection with specific apparatus, it is to be clearly understood that this description is made only by way of example and not as a limitation to the scope of my invention as set forth in the objects thereof and in the accompanying claims.

I claim:

1. An arrangement for assembling a working cylinder including a first casing shell having a mounting surface for a member to be actuated and a second casing shell supporting a working piston acting on a push rod in the direction of said member to be actuated comprising:
    first means to move said first and second shells into each other to compress an elastic seal disposed therebetween;
    measuring means supported from and controlling first means to ensure the actual distance between said mounting surface and a force-transmitting end of said push rod is equal to a predetermined distance; and
    second means supported by said first means to connect said first and second shells together in a positive engagement to maintain said predetermined distance;
    said mounting surface having a bore therein coaxial of a longitudinal axis of said working cylinder,
    said measuring means including an annular collar adjacent one end thereof and a probe disposed concentrically within said measuring means, and
    said first means including a plunger piston supporting said measuring means axially with respect to said push rod, to introduce said measuring means into said bore, to move said measuring means to cause said collar to abut said mounting surface to close said bore air-tight and to cause said probe to abut said force-transmitting end of said push rod, said probe opening an electrical contact when said predetermined distance is attained.

2. An arrangement according to claim 1, further including
    a spring disposed between said plunger piston and said collar to urge said collar into abutment with said mounting surface.

3. An arrangement according to claim 2, wherein said collar is constructed identical to a mounting flange of said member to be actuated.

4. An arrangement according to claim 1, wherein said collar is constructed identical to a mounting flange of said member to be actuated.

5. An arrangement according to claim 1, wherein said second means includes an annular hold-down device fastened to said plunger piston having a bearing surface urged by said plunger piston into abutment with a radially outwardly extending circumferential collar of said first shell when said first and second shells are fitted into each other, an end of said circumferential collar being supported by an annular collar of said second shell extending parallel to said axis.

6. An arrangement according to claim 5, wherein said second means further includes a plurality of shearing plungers carried by said plunger piston directed and guided radially towards said annular collar to shear a plurality of projections from said annular collar to engage a surface of said circumferential collar adjacent said bearing surface.

7. An arrangement according to claim 6, wherein said bearing surface is aligned relative to a shearing edge of said shearing plunger such that an edge of each of said plurality of projections are in abutment with said surface of said circumferential collar without clearance before said hold-down device is retracted.

8. An arrangement according to claims 1, 2, 3, 4, 5, 6 and 7, further including
    a pressing device connected to said plunger piston to move said plunger piston axially toward said second shell to a freely determined limit position.

9. An arrangement according to claim 1, wherein said measuring means provides said predetermined distance and said second means provides said positive engagement when said air-tight first and second shells have a pressure therein that occurs during the inactive position of said working cylinder when in normal operation.

* * * * *